(12) United States Patent
Bixby

(10) Patent No.: US 6,981,730 B2
(45) Date of Patent: Jan. 3, 2006

(54) SEAT STORAGE SYSTEM

(75) Inventor: Seth E. Bixby, Holland, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 10/495,053

(22) PCT Filed: Nov. 5, 2002

(86) PCT No.: PCT/US02/35468

§ 371 (c)(1),
(2), (4) Date: May 5, 2004

(87) PCT Pub. No.: WO03/039908

PCT Pub. Date: May 15, 2003

(65) Prior Publication Data

US 2004/0245797 A1 Dec. 9, 2004

Related U.S. Application Data

(60) Provisional application No. 60/346,085, filed on Nov. 7, 2001.

(51) Int. Cl.
*B60N 3/12* (2006.01)

(52) U.S. Cl. .............................. 296/37.15; 296/37.16; 297/188.1

(58) Field of Classification Search ............. 296/37.15, 296/37.16, 65.09; 297/188.01, 188.1, 188.11, 297/188.12, 188.08, 188.09, 188.04, 188.2; 224/275; 150/108; D3/313
See application file for complete search history.

(56) References Cited

U.S. PATENT DOCUMENTS

| | | | |
|---|---|---|---|
| 5,156,438 A | 10/1992 | Hayakawa et al. | |
| 5,195,802 A | 3/1993 | Hayakawa et al. | |
| 5,529,378 A | 6/1996 | Chaban et al. | |
| 5,547,052 A * | 8/1996 | Latshaw | 190/108 |
| 5,816,650 A * | 10/1998 | Lucas, Jr. | 297/188.1 |
| 5,902,009 A * | 5/1999 | Singh et al. | 297/188.1 |
| 5,915,777 A * | 6/1999 | Gignac et al. | 296/37.16 |
| 5,967,602 A * | 10/1999 | Ptak et al. | 296/37.15 |
| 6,015,071 A | 1/2000 | Adomeit et al. | |
| 6,050,202 A | 4/2000 | Thompson | |
| 6,059,358 A * | 5/2000 | Demick et al. | 297/188.01 |
| 6,074,000 A * | 6/2000 | Wagner | 297/188.11 |
| 6,076,880 A * | 6/2000 | Coffer et al. | 296/65.09 |
| 6,082,805 A * | 7/2000 | Gray et al. | 296/65.09 |
| D428,701 S * | 8/2000 | Lamo, Jr. | D3/313 |
| 6,102,463 A * | 8/2000 | Swanson et al. | 296/37.15 |
| 6,106,044 A * | 8/2000 | Schlachter | 296/37.15 |
| 6,161,896 A * | 12/2000 | Johnson et al. | 297/188.1 |
| 6,386,612 B2 * | 5/2002 | Hofmann et al. | 296/37.15 |
| 6,390,547 B1 * | 5/2002 | Spykerman | 296/37.15 |

(Continued)

*Primary Examiner*—Kiran B. Patel
(74) *Attorney, Agent, or Firm*—Price, Heneveld, Cooper, DeWitt & Litton

(57) ABSTRACT

A seat has a seating surface and a bottom to which a sliding panel is mounted. The bottom of the seat includes a storage bin for removably holding items stored therein, which is selectively exposed by the sliding panel when translated from a position aligned with the seat to a position translated outwardly from a vehicle door to expose the storage area in the bottom of the seat. A fold-down table is pivotally mounted to the sliding panel for providing a convenient work surface and for holding items, such as bags and the like, which are easily loaded and unloaded with the sliding panel in the translated position, extending from the side of the vehicle.

17 Claims, 2 Drawing Sheets

U.S. PATENT DOCUMENTS

| | | | |
|---|---|---|---|
| 6,644,523 B1 * | 11/2003 | Salas | 296/37.15 |
| 6,877,807 B2 * | 4/2005 | Mizuno et al. | 297/188.1 |
| 2004/0046429 A1 * | 3/2004 | Marshall et al. | 297/188.12 |
| 2004/0134946 A1 * | 7/2004 | Gammon | 224/275 |

* cited by examiner

SEAT STORAGE SYSTEM

This application claims the benefit of Provisional application Ser. No. 60/346,085, filed Nov. 7, 2001.

BACKGROUND OF THE INVENTION

The present invention relates to a vehicle seat storage system and particularly one which provides a lateral slide-out storage system for fold-up seats.

Multipurpose vehicles, such as sport utility vehicles, vans and the like which have a variety of seat configurations, are employed for numerous uses, such as shopping, transportation of children to and from school activities, heavy duty hauling and the like. Tradespeople use such vehicles to transport their tools and equipment as well as working from spaces within the vehicle. With such vehicles, the seats typically can be moved between normal seating positions and various lowered or raised positions or removed to accommodate different storage and transportation needs. Adjustable and/or removable storage bins have been located in the rear or trunk areas of vehicles, such as disclosed in U.S. Pat. Nos. 6,015,071 and 6,050,202. Some vehicle seats have seat backs which include recessed storage areas for use when the seat backs are folded down. There remains a need, however, for improved and more flexible storage systems in such vehicles and particularly one which takes advantage of seats which have a seating section which can be folded upwardly and latched to expose the floor area.

SUMMARY OF THE INVENTION

The system of the present invention satisfies such need by providing a vehicle with a seat section defining a seating surface and having an undersurface or bottom to which a sliding panel is mounted. The bottom of the seat may include a storage recess for removably holding items stored therein which is selectively exposed by sliding the sliding panel from a position coincident and overlying the storage recess to a translated position to expose the storage recess within the underside of the seat. A sliding panel in one embodiment of the invention includes a fold-down table which can be employed as a work surface above the vehicle floor, as a changing surface for an infant, and/or for holding items, such as grocery bags and the like, which is easily loaded and unloaded with the sliding panel in a laterally translated position, extending from the side of the vehicle. The sliding panel may include hooks for holding items having carrying straps, such as shopping bags. Upon loading of items, the sliding panel is slidably returned to its storage position overlapping the underside of the rear seat of the vehicle for transportation of items stored thereon.

The seat to which the panel is slidably mounted includes a latch for latching the seat in a generally vertical position adjacent the seat back to provide access to the additional storage features located in the bottom of the seat and on the panel with a fold-down table. With such a system, therefore, readily accessible storage is provided which can be easily accessed for loading and unloading of items to be stored thereon and which provides a table which can be used as a work surface, an infant changing surface, or for storage.

These and other features, objects and advantages of the present invention will become apparent upon reading the following description thereof together with reference to the accompanying drawings.

DETAILED DESCRIPTION OF THE PREFERRED EMBODIMENT

Figure 1:
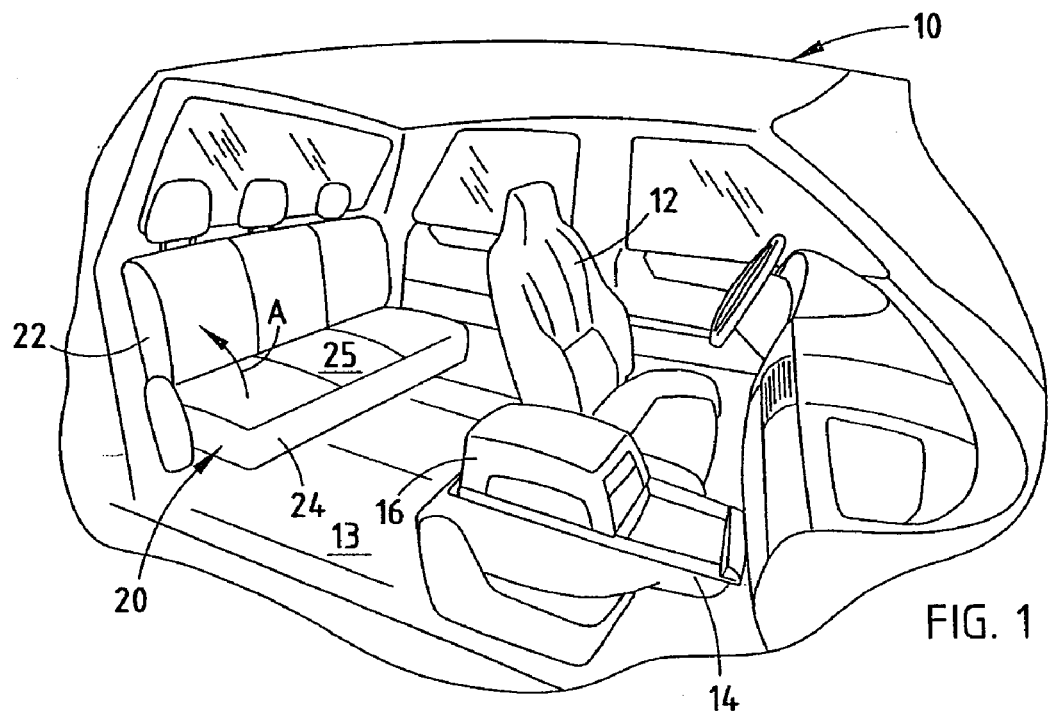
FIG. 1 is a fragmentary perspective view of a vehicle incorporating a seat storage system of the present invention.
Figure 2:
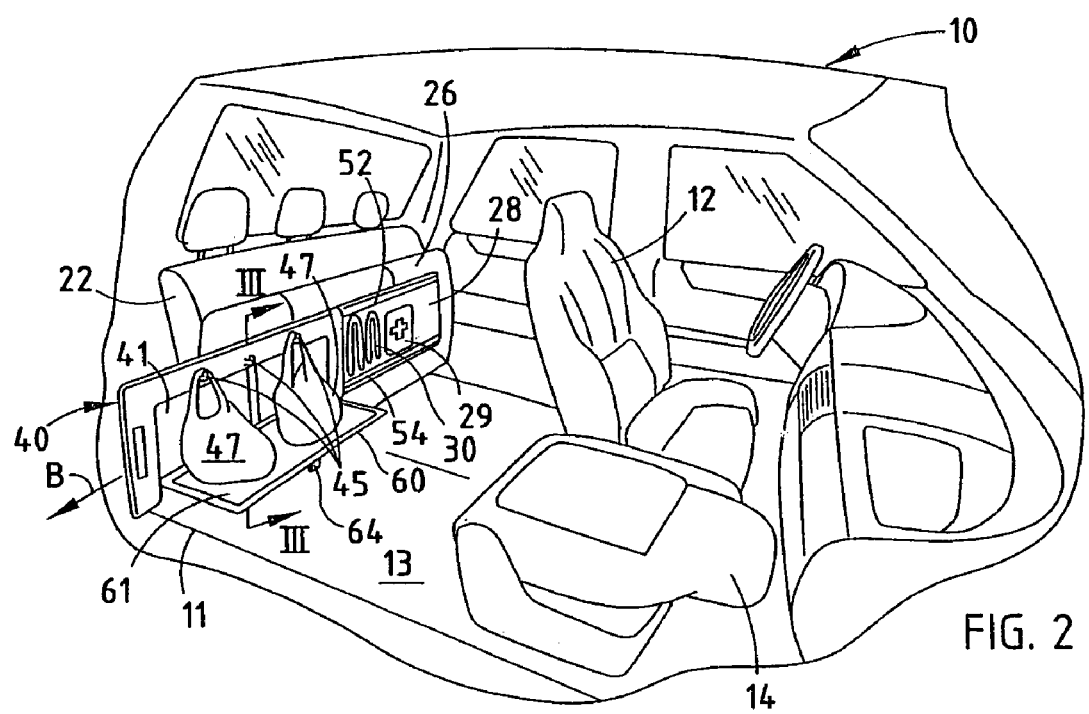
FIG. 2 is a fragmentary perspective view of the vehicle with the storage system of FIG. 1, shown in an operative position, with the sliding panel extended outwardly for loading and unloading.

Referring initially to FIG. 1, there is shown a vehicle 10, such as a van, minivan, sports utility vehicle or the like, which typically has a front passenger area with a drivers seat 12 and a passenger seat 14. Seat 14 may be folded down as seen in FIG. 1 and includes a removable storage console 16 releasably latched in a recess on the back 15 (FIG. 2) of seat 14. The vehicle includes rear seat assembly 20 having a seat back 22 and a seat section 24 which is pivotally mounted to the seat back with a latching mechanism such as disclosed in U.S. Pat. No. 5,195,802 such that the seat section 24 can be pivoted upwardly in the direction of arrow A (FIG. 1) and locked into a position substantially parallel and flush with seat back 22, as seen in FIG. 2. Seat section 24 includes a seating surface 25 and an undersurface or bottom 26 (FIG. 2). Bottom 28 has a centrally located, generally rectangular recess having a polymeric insert bin 28 mounted therein with a plurality of spaced pockets configured to snap-receive and hold a variety of items, such as a first aid kit 29, battery jumper cables 30, or the like, which snap-fit and are held within the polymeric bin mounted to the bottom of seat section 24. The bin may be configured to hold tools, such as open or box ended wrenches, screwdrivers, or other tools, when the bin is configured for tradespeople. The recess in seat bottom 26 thus can accommodate any one of several different bin configurations and a vehicle owner may have one or more such bins which can be removably attached within the recess in the seat bottom with conventional fasteners.

Figure 3:
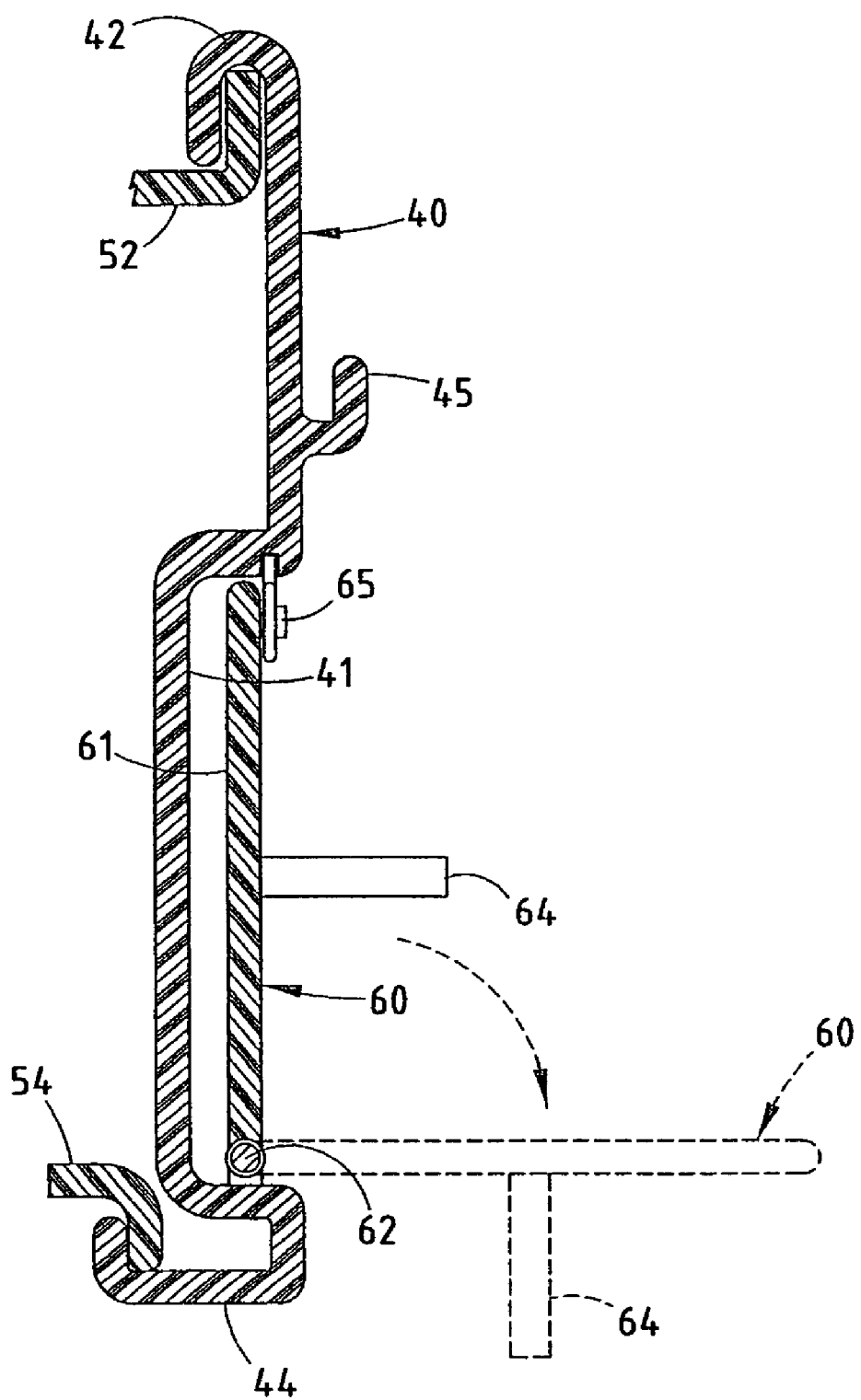
FIG. 3 is an enlarged fragmentary vertical cross-sectional view of the sliding panel and seat interface.

Slidably mounted to the bottom 26 of seat 24 is a sliding panel 40 which, as best seen in FIG. 3, has longitudinally extending parallel spaced-apart guides 42 and 44 which slidably extend over parallel spaced-apart guide rails 52 and 54, respectively, which extend outwardly from and longitudinally along the bottom 26 of seat 24. Panel 40 can, therefore, be extended outwardly, in a direction indicated by arrow B, to a position shown in FIG. 2 extending from the edge 11 of vehicle 10. Panel 40 then serves multiple functions including serving as a cover for storage bin 28 as well as itself, providing additional conveniently accessible storage, such as hooks 45 for receiving and holding shopping bags 47 (FIG. 2). Additionally, however, the outer surface 43 of panel 40 supports a fold-down table 60. Table 60 is pivotally mounted within a recess 41 in panel 40 by means of a hinge 62 (FIG. 3) and may include a fold-out leg 64 which is coupled by a hinge 65 to the bottom 63 of table 60 to support the table in an extended position as seen in phantom in FIG. 2. Table 60 can, when extended as seen in FIG. 2, serve as a work surface for a tradesperson's use, as an infant changing surface, or as an additional storage shelf, in addition to providing support for items such as bags 47. Hooks, such as hooks 45, extend in spaced relationship on panel 40 above table 60 and can be used independently of the table's position. The table is latched within recess 41 of panel 40 when not in use by a spring-loaded conventional latch 65 as seen in solid lines in FIG. 3. When deployed as seen in FIG. 2 and in phantom lines by pivoting downwardly (arrow C) in FIG. 3, table surface 61 is available for use regardless of the position of panel 40 (i.e., extended from seat bottom 26 or overlying the seat bottom). When the table is deployed and panel 40 extended, leg 64 is positioned to engage the vehicle floor 13. Additional support legs or a wide leg forming a U-shaped bar may be provided to provide additional support for table 61.

Panel 40 can be extended from edge 11 of vehicle 10 for easy access to the support table 60 for placing items 47 thereon which are held in place by their handles over hooks 45. Thus, with the storage system of the present invention, a sliding panel 40 is provided with a fold-down table 60, which can be extended from the vehicle for easily loading and unloading of items onto the support surface 61 of the table or for use of the table surface 61. The panel and table can subsequently be moved back into the vehicle, covering the storage recess 28 and allowing transportation of the items carried on the sliding storage unit so formed. When not in the position shown in FIG. 2 but with seat 24 raised, panel 40 serves as a cover for bin 28, and the floor 13 of vehicle 10 is exposed for storage. Hooks 45, however, can still be used for additional storage.

In a preferred embodiment of the invention, panel 40 and table 60 are molded of a suitable polymeric material, such as ABS or glass-filled polypropylene, as are guide rails 52 and 54 integrally formed either with the storage bin 28 mounted to the bottom 26 of seat section 24 or on the seat bottom itself. When not in use, table 60 is folded up and latched with a suitable spring-loaded latch 65 (FIG. 3) which holds the table in a flush position, as shown in FIG. 3. The panel 40 can also be releasably latched with detents between guide rails 52 and 54 and guides 42 and 44 or by other means for holding the panel in an overlapping position substantially aligned with the bottom 26 of seat section 24 or held in other selected extended positions, such as shown in FIG. 2, for loading and unloading items.

Thus, the system of the present invention provides a convenient, readily accessible sliding storage and work surface unit which can extend from the vehicle for loading, unloading, and use and which provides storage in areas of the vehicle not typically used. In one embodiment, the drop-down table can be pivotally mounted directly to the seat bottom itself and serve as a cover for an auxiliary storage bin, such as bin 28, in addition to functioning as a storage shelf or work surface. It will become apparent to those skilled in the art that this and other various modifications to the preferred embodiment of the invention as described herein can be made without departing from the spirit or scope of the invention as defined by the appended claims.

The invention claimed is:

1. A vehicle seat storage system comprising:
    a vehicle seat having a seat back and a seat section wherein the seat section is adapted to be mounted for movement between a generally horizontal seating position and a raised, stored position substantially flush with the seat back, wherein said seat section includes a bottom and at least one guide extending longitudinally along said bottom;
    a storage recess formed in said seat bottom; and
    a panel slidably mounted to said guide for extending from a position aligned with the bottom of the seat for covering said storage recess to a position projecting laterally from said aligned position.

2. The storage system as defined in claim 1 wherein said panel includes a pivot-down table for supporting items positioned on said table.

3. The storage system as defined in claim 2 wherein said table is hingedly mounted to said panel.

4. The storage system as defined in claim 1 wherein said bottom of the seat section includes a storage bin.

5. The storage system as defined in claim 4 wherein said bottom of said seat includes a pair of parallel spaced-apart guide rails.

6. The storage system as defined in claim 5 wherein said panel includes guides which slidably engage said rails.

7. The storage system as defined in claim 6 wherein said panel is integrally molded of a polymeric material.

8. The storage system as defined in claim 7 wherein said polymeric material is glass-filled polypropylene.

9. The storage system as defined in claim 7 wherein said polymeric material is ABS.

10. The storage system as defined in claim 2 wherein said panel includes a plurality of hooks positioned above said table for holding items.

11. The storage system as defined in claim 1 and further including a storage bin for snap-in attachment to said storage recess.

12. A vehicle seat storage system comprising:
    a vehicle seat having a seat back and a seat section wherein the seat section is adapted to be mounted for movement between a generally horizontal seating position and a raised, stored position substantially flush with the seat back, wherein said seat section includes a bottom;
    a storage recess formed in said bottom of said seat section; and
    a pivot-down table pivotally mounted to said seat bottom for selectively covering said storage recess and for supporting items positioned on said table.

13. The storage system as defined in claim 12 wherein the bottom of the seat section includes a storage bin removably coupled to said storage recess.

14. The storage system as defined in claim 13 wherein said table includes a pivoted support leg for engaging the floor of a vehicle.

15. The storage system as defined in claim 14 wherein said bottom of said seat includes a pair of parallel spaced-apart guide rails and further including a sliding panel mounted to said guide rails for extending from a position aligned with the bottom of the seat to a position projecting laterally from said aligned position.

16. The storage system as defined in claim 15 wherein said table is hingedly mounted to said panel.

17. The storage system as defined in claim 16 wherein said panel and table are individually molded of a polymeric material.

* * * * *